Patented Sept. 2, 1924.

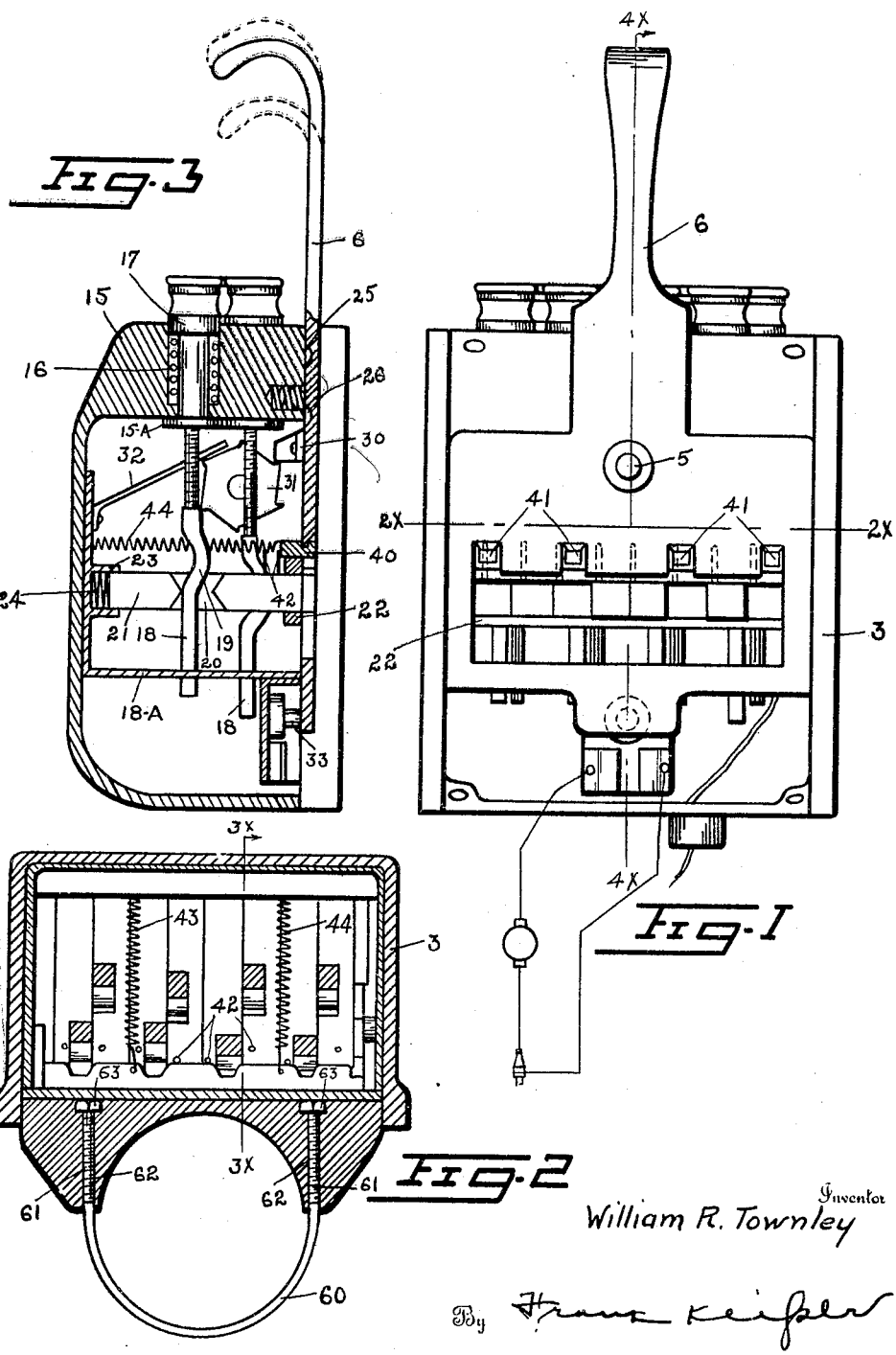

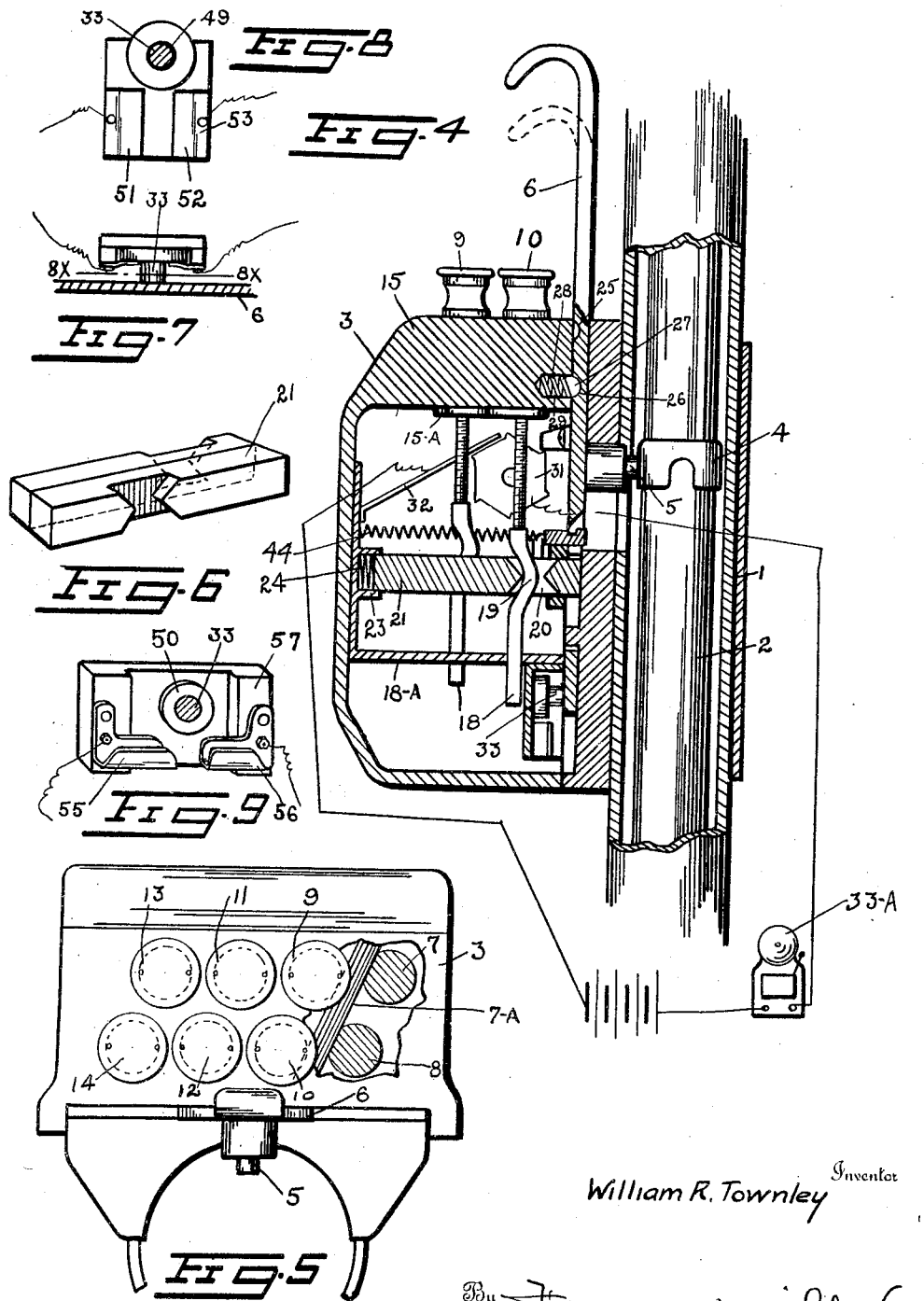

1,507,401

UNITED STATES PATENT OFFICE.

WILLIAM R. TOWNLEY, OF CORNING, NEW YORK, ASSIGNOR, BY MESNE ASSIGNMENTS, TO ROCHESTER LOCK CORPORATION, OF ROCHESTER, NEW YORK, A CORPORATION OF NEW YORK.

AUTOMOBILE LOCK.

Application filed January 5, 1921. Serial No. 435,249.

*To all whom it may concern:*

Be it known that I, WILLIAM R. TOWNLEY, a citizen of the United States, residing at Corning, in the county of Steuben and State of New York, have invented certain new and useful Improvements in Automobile Locks, of which the following is a specification.

The object of this invention is to provide a new and improved form of lock for automobiles in which the steering mechanism is locked or released by a sliding latch plate which closes the ignition circuit when in unlocking position, this latch plate being controlled by a combination lock and being protected by an alarm mechanism against an improper manipulation.

This and other objects of this invention will be fully illustrated in the drawings, described in the specification and pointed out in the claims at the end thereof.

In the accompanying drawings:

Fig. 1 is a rear elevation of the lock, showing the latch plate and locking bolts.

Fig. 2 is a horizontal section on the line 2˟—2˟ of Fig. 1.

Fig. 3 is a vertical section on the line 3˟—3˟ of Fig. 2, the latch plate being shown moved down into engagement with the locking plate.

Fig. 4 is a vertical section on the line 4˟—4˟ of Fig. 1.

Fig. 5 is a top plan view of the lock, the top of the lock being shown partly broken away.

Fig. 6 is a perspective view of a pair of the locking bolts, one for each row of keys.

Fig. 7 is a horizontal section of the latch plate, showing a modified form of switch.

Fig. 8 is a front, sectional elevation of the switch shown in Fig. 7, the section being taken on the line 8˟—8˟ of Fig. 7.

Fig. 9 is a perspective view of a modified form of switch.

In the drawings, like reference numerals indicate like parts.

In the drawings, reference numeral 1 indicates the fixed standard of an automobile steering mechanism within which a movable steering post 2 is arranged. On the standard is provided the automobile lock 3, which forms the subject matter of this invention. Fastened rigidly to the steering post 2 is a locking collar 4. Mounted on the auto lock 3 is a latch bolt 5 adapted to be moved into engagement with any one of a plurality of recesses in the collar 4 to prevent the turning of the collar and this, in turn, will prevent the turning of the steering post 2 and the steering wheel attached thereto. The movement of the latch bolt 5 is up and down as shown in Fig. 4, and said latch bolt is secured to the latch plate 6 and adapted to move therewith to the limit shown in Fig. 4 when the locking bolts 21, to be hereinafter more particularly described, are withdrawn, it being understood that in Fig. 4, the latch bolt 5 and the locking bolts 21 are shown in locking position. The latch plate moves down from the position shown in Fig. 4, carrying with it the latch bolt 5 out of engagement with the collar 4. This permits the rotation of the collar and the steering of the car, which otherwise is prevented. While the latch plate 6 is in the raised position shown in Fig. 4, it is held in that position by a locking mechanism which includes said locking bolts and which will now be described.

In the lock, eight keys 7 to 14, inclusive, are provided said keys are shown arranged in two parallel rows (see Fig. 5,) the keys of one row being staggered with relation to the keys in the other row. Each of these keys has its upper portion slidably arranged in a socket in the key plate or top wall 15 of the lock and between guide plates 15ᴬ at the bottom of said key plate or wall. Each of the sockets is provided with a spring 16 that engages under a shoulder 17 on the key slidable therein and by means of which the key is normally held in raised position. When the key is pressed down, the spring is compressed. When the driver's fingers are removed from the keys, the springs will restore the keys to their normal position.

Each key has a stem 18 which is threaded into the upper portion of the key so that each stem may be lengthened or shortened, for a purpose to appear hereinafter. These stems are guided at the bottom by the guides 18ᴬ. Below its threaded portion each stem is bent to form a cam 19 which is adapted to engage one of the cam slots 20 in the locking bolts 21, one of which bolts is provided for each key. In preferred arrangement, the bolts for the even numbered keys have the cams thereof set forward of the cams in the bolts for the odd numbered keys. Each of these locking bolts 21 moves thru an opening at the forward end in a plate 22 and at the rear end engages with the pocket 23, which contains a spring 24 that normally presses the locking bolt to the right as shown in Figs. 3 and 4.

As shown in Fig. 4, the stem of the key 9 is adjusted to a higher position than the stem of the key 10. The key 9 holds its co-acting locking bolt 21 back or to the left, while the key 10 holds its co-acting locking bolt forward or to the right. The locking bolt 21 of the key 10 and other bolts co-acting with like adjusted keys project into the path of the latch plate 6 and prevent the downward movement thereof beyond a certain point, thus preventing the unlocking of the steering gear of the car, as above explained. Certain ones of the stems 18 will be in raised position, as shown for key 9, and other stems will be lowered, as shown by key 10. When this arrangement is complete, the keys will be locked against turning by the guide plates 15A, each of which is disposed diagonally between four keys and engages with a flat side on each of said keys. The keys having their stems in lowered position, corresponding to key 10, must be pushed down to withdraw their co-acting bolts 21 from the latch plate and the other keys must be left undisturbed. If any of the other keys are pushed down, their bolts will be thrown forward under the latch plate and each bolt thrown forward will lock the latch plate, which the operator is trying to release, and will thus prevent the unlocking of the steering mechanism. Any small number of the keys may be set corresponding to key 10 and when so set, those keys must all be depressed at the same time to release the latch plate 6 after being locked and no other key may be depressed. The operator must know just what keys he should press to release the latch plate 6, and if he depresses any other key than these, the steering mechanism will remain locked in spite of the operator's efforts to release it. In consequence of this, the lock will make it extremely difficult for a thief to unlock and steal the car. The latch plate is recessed in two places as indicated at 25 and 26 in Fig. 3. The key plate is provided with a ball 27 pressed forward by a spring 28, carried in a socket 29. This ball engages with recesses 25 and 26 and will hold the latch plate in the one position or the other to correspond. The distance which the latch plate normally moves from the locking to the unlocking position, is shown by the difference between the full and dotted lines at the top of Fig. 4. As shown in Fig. 4, the latch plate 6 does not normally engage with the locking bolts 21, but must move a short distance before making engagement.

A thief may try out the lock and detect the combination on which it is set by pushing the keys down, one at a time, and work the latch plate 6, thru this lost motion, and may thus determine by the sense of touch what keys must be pushed in order to unlock the latch plate. To prevent this, I have added the locking plate 40 which is shown provided with four teeth 41, 41, thereon, which teeth engage with notches in the latch plate 6 and make a close engagement therewith. These teeth are recessed as shown in Fig. 3 to interlock with or positively engage with the latch plate so that the plate 40 cannot move rearwardly away from the latch plate unless the latch plate is in its highest position. This locking plate 40 is held in engagement with the latch plate by pins 42 provided on the locking bolts 21. The pins 42 are provided on all the locking bolts but the bolts that are out of the combination, will be set back so that the pins 42 carried thereon will not limit the releasing movement of the locking plate 40, which will be controlled only by the pins 42 on the bolts in the combination. Unless all of the locking bolts that are set to engage with the latch plate are drawn back at the same time, the locking plate will be held in locking engagement with the latch plate 6 by one or more of said pins 42 and this will prevent the operation of the latch plate. But, if all of the locking bolts in the combination are withdrawn from their positions underneath the latch plate, then the springs 43 and 44 operate to draw the locking plate back and release the latch plate, thereafter permitting the movement of the latch plate to unlock the steering mechanism of the car. It will be understood because of the interlocking engagement between the latch plate and the locking plate, that the locking plate will not be withdrawn to release the latch plate except when the latch plate is in its highest position. This locking plate will prevent a thief from testing the lock for the purpose of discovering the combination on which it is set, and he will thereby be prevented from beating the lock and stealing the car.

If the latch plate is pushed down from the upper dotted line position to the full line position shown in Fig. 3 against the locking plate 40, its movement will be prematurely arrested thereby and this will be accompanied by the sounding of an alarm in a manner that I will now describe.

Carried on the latch plate 6 is a dog 30, which engages with the teeth in the ratchet wheel 31 and each complete downward movement of the latch plate will turn the ratchet wheel the distance of one tooth or one-sixth of a revolution. When the latch plate 6 moves up, the dog 30, being made of spring metal, will slide over the tooth and be bent thereby until it passes the upper end of the tooth, when it will spring forward and renew its extended position so as to engage with one of the teeth on its next downward movement.

As the ratchet wheel 31 is turned by the latch plate, one of the teeth engages with the contact plate 32 and closes an electric circuit and rings a bell 33^A located in any convenient position on the car outside of the latch. If the latch plate makes a full stroke, the tooth will quickly pass by the contact plate and the alarm sounded will be a short one, but if the latch plate is arrested by the locking plate 40, the contact will remain to close the circuit and ring the bell until the proper keys have been pushed in and the latch plate has been moved to the end of its stroke, thus completing the turn of the ratchet wheel 31 and until this is done, the circuit will remain closed and the alarm will continue to ring. In the position shown in Fig. 4, the contact plate 32 is normally out of contact with the wheel 31 by a slight interval, but the contact is made by a short turn of the wheel as shown in Fig. 3.

In Figs. 7 and 8 I have shown detail views of the switch in which 6 indicates the latch plate, carrying a pin 33, on which is carried a metal washer, insulated from the pin by a fiber bushing 49, which washer moves into and out of engagement with the stationary contacts 51 and 52, carried on the plate 53. When the latch plate is down, the washer 50 is in engagement with the contacts 51 and 52, the ignition circuit is closed so that the engine will run, and the steering mechanism is released. When it is raised, the steering mechanism is locked and the ignition circuit is broken so that the car cannot be steered and the engine will not run because the ignition circuit is open.

For the purpose of fastening the lock on the steering head, the casing of the lock is cast with a half round depression that fits one half way round the steering head. To this casing I fasten the sheet metal band strap 60 which extends nearly the full length of the lock along the steering post and engages in slots provided in the case of the lock which slots are closed at each end so that the edges of the band are concealed all around in each slot. To this band are spot welded the screws 61 which extend thru holes 62 provided in the casing and are fastened therein by the nuts 63. The casing is recessed or countersunk to receive these nuts. In this way, the lock is securely fastened to the steering post.

In Fig. 9 I have shown a modification of the switch in which 33 indicates the pin in section carried on the latch plate, on which is carried a metal washer 50, insulated from the pin by a fiber bushing 49, which washer moves into and out of engagement with the stationary contacts 55 and 56, carried on the plate 57. When the latch plate is down, the washer 50 is in engagement with the contacts 55 and 56, the ignition circuit is closed so that the engine will run and the steering mechanism is released, etc., as above described in connection with Figs. 7 and 8.

While the bolts 21 are herein referred to as locking bolts, it is apparent from the foregoing description that they do not directly lock the latch plate, since interposed between these bolts and the latch plate is the locking plate 40, yet said locking plate would not, in the preferred arrangement shown in the drawings, be capable of locking the latch plate without co-operation of said bolts 21, which are therefore properly termed locking bolts.

It is further to be understood that the pins 42 on said bolts are in reality the parts actuating said locking plate, and that the keys 15, their stems 18, and the locking bolts 21 may, in another sense, be considered as means for actuating said pins, which pins may be referred to as holding means, since they actuate or move the locking plate into locking position underneath the latch plate and hold the same in such locking position.

I claim:

1. In an auto lock, a plurality of bolts movably mounted, a latch plate disposed at an angle to said bolts, a locking plate engaging said latch plate and holding it against movement, each of said bolts separately engaging with said locking plate and holding it in locking position, and keys for moving said bolts to release said locking plate.

2. In an auto lock, the combination with a latch element adapted to lock another element against movement, a locking element, a plurality of selective locking bolts normally positioning said locking element against said latch element when in unlocked position, said locking bolts moving said locking element into locking position when said latch element is moved into locking position, and means for moving said locking bolts to permit said locking element to return to unlocking position.

3. A mechanism of the kind described, comprising a reciprocable latch element, a plurality of locking elements reciprocable at an angle to said latch element, certain of said locking elements being retained out of the path of movement of said latch element and others being retained in the path of said latch element, a single locking element interposed between said latch element and said plurality of locking elements and adapted to be moved underneath said latch element by said plurality of locking elements when the latch element is positioned at the end of its movement in one direction, and means for withdrawing said locking element when moving certain of said plurality of locking elements out of the path of movement of said latch element.

4. A mechanism of the kind described, comprising a reciprocable latch element adapted to lock another element against movement, a plurality of locking bolts arranged for reciprocable movement at right angles to the movement of said latch element, selective means for moving said locking bolts and for retaining certain of said locking bolts at the end of their movements in one direction and others at the end of their movements in the opposite direction, a locking plate cooperating with said locking bolts and being positioned by certain of said locking bolts in the path of said latch element when the latter is in locking position, said last-mentioned locking bolts being adapted for actuation to release said locking element from said latch plate and allow the latter to be moved into unlocking position.

5. A mechanism of the kind described, comprising a reciprocable latch element adapted to lock another element against movement, a plurality of locking bolts, a locking element movable into and out of the path of said latch element, said locking element being moved into the path of said latch plate by certain of said locking bolts selected as a combination, means for moving said locking element out of the path of said latch plate when released by said last-mentioned locking bolts, and keys adapted to actuate said locking bolts, one being provided for each of said plurality of locking bolts.

6. An auto lock of the kind described having a latch element, a series of manipulating elements movable parallel with said latch element, bolts arranged at right angles to said latch element and said manipulating elements, a locking element adapted to be moved into the path of said latch element by said bolts, and means to move said locking element out of the path of said latch element when released from said bolts.

7. An auto lock of the kind described having a reciprocable latch element, a series of manipulating elements movable parallel with said latch element, a series of bolts movable at right angles to the movement of said latch element and said manipulating elements, one of said bolts being provided for each manipulating element, said manipulating elements and bolts having co-acting means whereby certain of said bolts are moved into the path of said latch element when actuating their co-acting manipulating elements and whereby other bolts are moved out of the path of said latch element when actuating their co-acting manipulating elements, a locking element between said bolts and said latch element, said locking element being moved into the path of said latch plate by certain of said bolts and being retained in the path of said lock plate when moving other of said bolts, and means for moving the locking element out of the path of said latch plate when released by all of said bolts.

8. A mechanism of the kind described, comprising a reciprocable latch plate, a series of reciprocable bolts arranged in two sets, keys spring-retained and co-acting with said bolts to retain one set of said bolts at the end of their movement in one direction and the remaining bolts at the end of their movement in the opposite direction, one set of said bolts being moved in one direction when actuating their co-acting keys and the other set being moved in the opposite direction when actuating their co-acting keys, a locking plate retained in locking engagement with said latch plate when in locking position by one set of said bolts, and means to move said locking plate into unlocking position when said last-mentioned set of bolts is actuated, one or more of the other set of said bolts, when actuated preventing said lock plate from moving into unlocking position.

9. A mechanism of the kind described, comprising a latch plate, a series of bolts, a series of manipulating keys for actuating said bolts, one key being provided for each of said bolts, and a locking element disposed between said latch plate and said keys, the bolts co-acting with certain of said keys having means to actuate said locking plate and lock the same to said latch plate, the other bolts having means to retain said locking plate in locking position when the manipulating keys co-acting with said last-mentioned bolts are actuated.

In testimony whereof I affix my signature.

WILLIAM R. TOWNLEY.